Sept. 3, 1929.  M. McCOMAS  1,726,850
WINDOW FASTENER
Filed Feb. 28, 1928
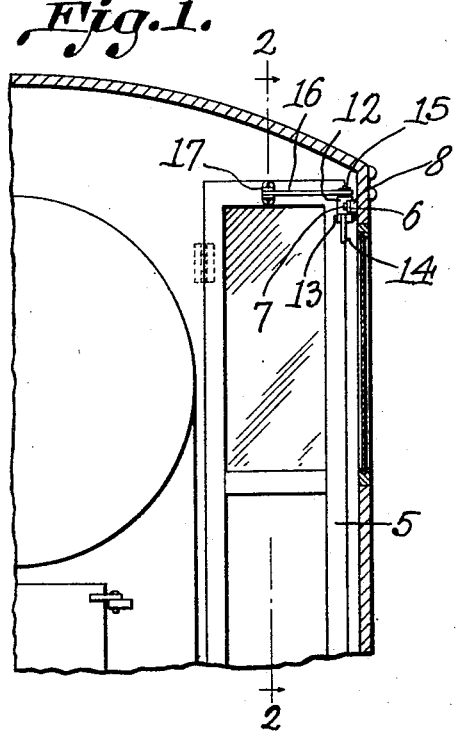
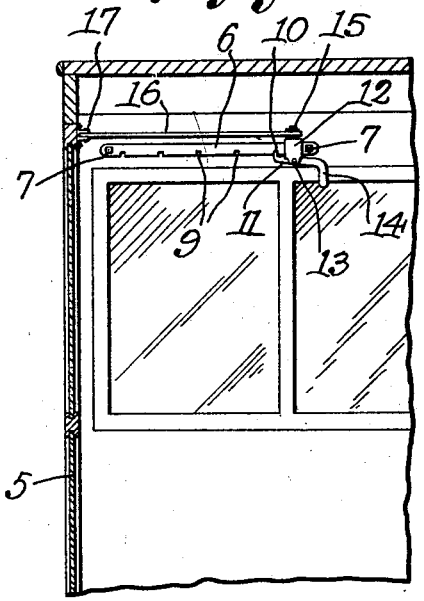
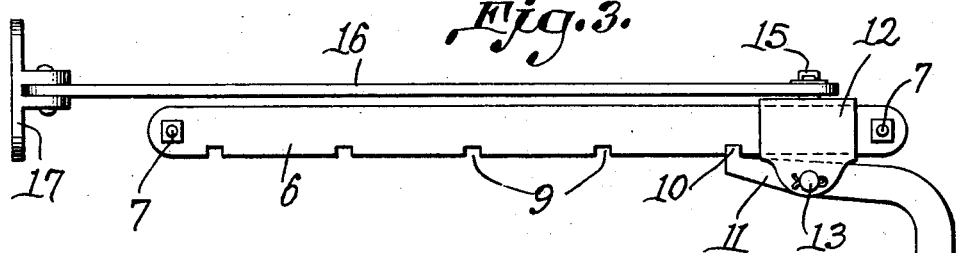
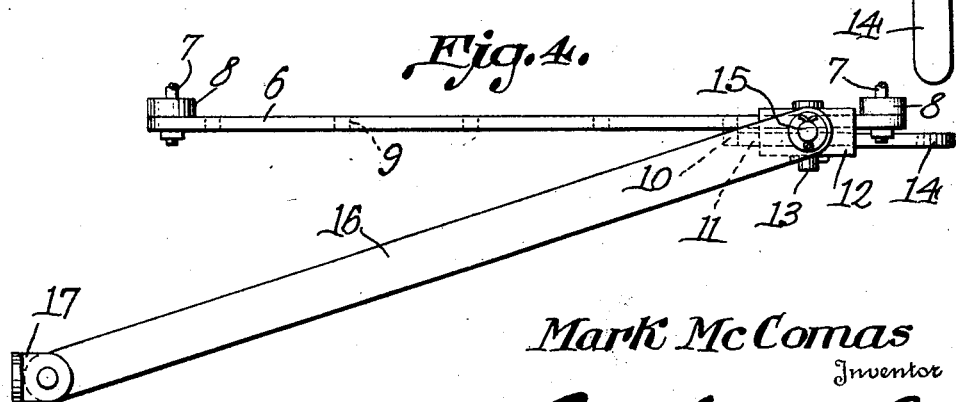
Mark McComas
Inventor
By C. A. Snow & Co.
Attorneys Patented Sept. 3, 1929.

1,726,850

UNITED STATES PATENT OFFICE.

MARK McCOMAS, OF DENISON, TEXAS, ASSIGNOR OF ONE-HALF TO C. E. STANTON, OF DALLAS, TEXAS.

WINDOW FASTENER.

Application filed February 28, 1928. Serial No. 257,713.

This invention has reference to a door securing device, and aims to provide novel means whereby the front doors of a locomotive cab may be held in their open or partially open positions.

An important object of the invention is to provide a device of this character which may be readily and easily positioned, and one wherein the sliding member, forming a part thereof, may be latched and unlatched readily.

A still further object of the invention is to provide a latch including a handle, the latch being so mounted that the handle will hang to urge the latching end of the latch within its keeper.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a vertical sectional view through a portion of a locomotive cab, showing a door equipped with the device forming the essence of the invention.

Figure 2 is a sectional view taken on line 2—2 of Figure 1.

Figure 3 is an elevational view of the securing device.

Figure 4 is a plan view thereof.

Referring to the drawing in detail, the reference character 5 designates a cab door of a locomotive which swings outwardly, in the usual and well known manner.

The securing device forming the essence of this invention, includes a bar 6 which is secured within the cab and extends at right angles to the upper edge of the door, when the door is in its closed position.

This bar 6 is secured by means of the bolts 7 that pass through openings in the ends of the bar, and through spaces 8 which are held against the inner side of the cab so that the bar 6 will be supported in spaced relation with the side of the cab.

Formed in the under surface or lower edge of the bar 6 are notches 9 that are designed to receive the lug 10 of the latch 11, the notches 9 acting as keepers for the latch. Supported on the bar 6 for movement longitudinally thereof, is a slide 12 which has depending ears between which the latch member 11 is pivotally supported, the latch member being shown as mounted on the pivot pin 13, which passes through the latch member 11 at a point adjacent to the latching end thereof.

The handle of the latch is indicated at 14 and is sufficiently heavy to normally urge the inner end of the latch member upwardly, with the result that the lug 10 is held in its keeper. Extending upwardly from the slide 12 is a pivot pin 15 that extends through an opening formed in one end of the connecting link 16, the opposite end of the connecting link being pivotally connected to the bracket 17 that in turn is secured to the closure 5.

From the foregoing it will be seen that should it be desired to latch the door in its closed position, the slide is moved to a position as shown by Figure 3, but when it is desired to latch the door in an open or semi-open position, the latch member is moved from its position as shown by Figure 3 and positioned to engage within one of the keepers, whereupon the latch member is released and the lug 10 held in position by the weight of the handle 14 of the device.

I claim:

A door securing device including a bar having notches formed in the lower edge thereof, said bar adapted to be secured adjacent to a door, a slide mounted on the bar and having an upstanding pivot pin formed thereon, a latch member pivotally connected with the slide and having a laterally extended lug adapted to fit into the notches to hold the slide in its positions of adjustment along the bar, a handle forming a part of the latch member, said handle adapted to overbalance the latch member to normally hold the lug against the bar, a link pivotally connected to the door and having an opening to receive the pivot pin to pivotally connect the link to the slide.

In testimony that I claim the foregoing as my own, I have hereto affixed my signature.

MARK McCOMAS.